US007880419B2

(12) United States Patent
Sihler et al.

(10) Patent No.: US 7,880,419 B2
(45) Date of Patent: Feb. 1, 2011

(54) MVDC POWER TRANSMISSION SYSTEM FOR SUB-SEA LOADS

(75) Inventors: Christof Martin Sihler, Hallbergnoos (DE); Robert Roesner, Bayern (DE); Rajib Datta, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 386 days.

(21) Appl. No.: 12/074,223

(22) Filed: Feb. 29, 2008

(65) Prior Publication Data
US 2009/0146603 A1   Jun. 11, 2009

(30) Foreign Application Priority Data
Dec. 11, 2007   (EP)   ................... 07122959

(51) Int. Cl.
*H02P 1/00*   (2006.01)
(52) U.S. Cl. .................. 318/504; 318/800; 318/812
(58) Field of Classification Search ........... 318/504, 318/800, 812, 813, 807; 323/282; 363/132; 315/308
See application file for complete search history.

(56) References Cited
U.S. PATENT DOCUMENTS

| 3,968,419 | A | 7/1976 | Ekstrom |
| 4,019,115 | A | 4/1977 | Lips |
| 4,837,671 | A | 6/1989 | Wild et al. |
| 6,670,721 | B2 | 12/2003 | Lof et al. |
| 6,751,106 | B2 | 6/2004 | Zhang et al. |
| 7,439,690 | B2 * | 10/2008 | Fukuwa ...................... 315/308 |
| 2006/0126242 | A1 | 6/2006 | Datta et al. |
| 2006/0227578 | A1 | 10/2006 | Datta et al. |
| 2009/0108767 | A1 * | 4/2009 | Kohno et al. ................ 315/291 |

FOREIGN PATENT DOCUMENTS

| DE | 19847680 | 10/1998 |
| GB | 1420984 | 1/1976 |
| GB | 1520884 | 8/1978 |
| GB | 2397445 | 7/2004 |
| JP | 11089235 | 9/2000 |
| JP | 2000245066 | 9/2000 |
| WO | WO0152379 | 7/2001 |
| WO | WO2007/071266 A1 | 6/2007 |

* cited by examiner

*Primary Examiner*—Karen Masih
(74) *Attorney, Agent, or Firm*—Patrick K. Patnode

(57) ABSTRACT

A system for the transmission of a direct current (DC) at a medium voltage level includes a system DC link configured to carry power from a source to a load module. The load module includes a DC-to-DC voltage step-down converter, a DC-to-AC inverter coupled downstream to the DC-to-DC voltage step-down converter, and a system AC link for carrying power from the load module to a motor system on a load side of the system AC link. The system is effective for delivering power over distances that are greater than 30 kilometers, and for delivery of power from an on-shore to offshore and sub-sea load.

20 Claims, 7 Drawing Sheets

MVDC POWER TRANSMISSION SYSTEM FOR SUB-SEA LOADS

CROSS REFERENCE TO RELATED APPLICATION

This application claims priority to EP Application Serial No. 07122959.5 filed Dec. 11, 2007, incorporated in its entirety herein by reference.

BACKGROUND

This invention relates generally to converter topologies useful for direct current (DC) transmission, and more particularly to a medium voltage direct current (MVDC) transmission system for sub-sea loads.

Transportation of electrical power to oil and gas sub-sea electrical equipment often requires high power to be transported over long distances. Transmission to sub-sea equipment is used to supply the power from an onshore utility to a point where the power is distributed among individual loads. Generally, a step down transformer is implemented in order to bring the high voltage level of the transmission stage to a lower voltage level for a distribution stage to individual units of the electrical equipment. Distribution distances are typically shorter than the transmission distance; and the voltage levels to be supplied to individual loads or load clusters are lower than the voltage levels of the transmission stage. Typically, power on the order of 50 megawatts is transmitted by high voltage alternating current (AC) transmission cables to a high voltage transformer, thereafter stepping down the voltage for a medium voltage AC distribution system.

Typically, in AC power systems, medium voltage is used in the power distribution system and includes nominal voltages of 12, 24, and 36 kV. The next commonly used nominal voltage is 72 kV (which is not considered to be a medium voltage but rather a high voltage for power transmission). Since the phase-to-phase voltages in a 36 kV three-phase-system reach amplitudes of more than 50 kV, DC transmission systems with +/−50 kV are considered herein to fall within the scope of MVDC power transmission systems for sub-sea loads. Transmission voltages of +/100 kV or higher are therefore considered herein to be outside the scope of MVDC power transmission systems for sub-sea loads. Such voltages are used in HVDC transmission projects where high power is transmitted over long distance (e.g., in transmitting 100 MW or 200 MW over a distance of 100 or 200 km).

AC transmission provides technical challenges for applications where bulk power is transmitted over long cables. Capacitance causes charging current to flow along the length of the AC cable. Because the cable must carry this current as well as the useful load current, this physical limitation reduces the load carrying capability of the cable. Because capacitance is distributed along the entire length of the cable, longer lengths produce higher capacitances, thus resulting in higher charging currents. As the cable system design voltage is increased to minimize the line losses and voltage drop, the charging current also increases.

Typically, multiphase booster pumps require electrically driven motors delivering a shaft power between 2 MW and 6 MW. Future offshore oil and gas resource installations will require pump installations at distances above 50 km from the shore. Such distances require a high voltage power transmission; however, high voltage AC transmission is very costly when supplying single sub-sea pumps or clusters of a few sub-sea pumps only, where the power to be transmitted is at or below 20 MW.

Further, sub-sea motors driving a gas compressor typically have a higher nominal power (e. g., in the order of 10 or 15 MW). As such, sub-sea compression clusters may be required to transmit a total power in the order of 50 to 100 MW over a distance of 100 or 200 km. The transmission of high power over a distance of more than 100 km and distributing the power sub-sea is very challenging with AC transmission and distribution systems because of the high charging currents and the high number of components involved in the distribution system.

In general, DC transmission can be achieved more efficiently over long distances than AC transmission. High voltage (HV) DC transmission typically requires the usage of power electronic converters in the transmission systems that are capable of converting between HVAC and HVDC. In conventional HVDC converter topologies, each switch of the converter is designed to handle high voltages. The converter nominal voltage may range from tens-of-kilovolts to hundreds-of-kilovolts, depending upon the application. Such switches are typically configured utilizing a plurality of series connected semiconductor devices (e.g., such as insulated gate bipolar transistors (IGBTs) and thyristors). Because of the size and the high number of components involved, conventional HVDC terminals are not well suited for sub-sea installations.

Converters are also required on the load side of a power distribution system when supplying variable speed motors in addition to the power conversion required for HVDC transmission. Typically, a high voltage transformer is used to step down the voltage from the AC or DC transmission level to the voltage level used in the AC power distribution system. On the load side of the distribution system, the converters convert the power from fixed frequency AC voltage (stepped down from the transmission system) to a variable frequency AC voltage of individual motors that must be controllable over a wide speed range when driving sub-sea pumps or compressors.

A need therefore exists for a power transmission system for sub-sea loads that substantially reduces the costs and increases the reliability beyond that achievable when using known HVAC and HVDC transmission techniques, particularly for applications using single sub-sea motors at a distance above 50 km.

BRIEF DESCRIPTION

An exemplary embodiment of the present invention comprises a system for the transmission of a direct current (DC) at a medium voltage level. The system comprises a system DC link, wherein the system DC link is configured to carry power from a source to a load module. The load module comprises a DC-to-DC voltage step-down converter, and a DC-to-AC inverter, the DC-to-AC inverter coupled downstream to the DC-to-DC voltage step- down converter. The system also comprises a system AC link for carrying power from the load module to a motor system on a load side of the system AC link.

A yet further exemplary embodiment of the present invention comprises a system for the transmission and distribution of a direct current (DC) at a medium voltage level. The system comprises a system DC link, wherein the system DC link is configured to carry power from a source to a load module. The load module comprises a DC-to-DC voltage step-down converter, and a DC distribution system on the load side of the DC-to-DC voltage step-down converter. The DC distribution system comprises at least two DC-to-AC power converter modules coupled to the output of the step-down converter, each power converter module comprising either a current source inverter (CSI) or a voltage source inverter (VSI) coupled with a DC-to-DC converter, the DC-to-DC converter being installed between the system DC link downstream from the DC-to-DC voltage step-down converter and the VSI. Further, the system comprises at least two system AC links for carrying power from each DC-to AC inverter to a motor system on a load side of the system AC link.

Yet another exemplary embodiment of the present invention comprises a method of transmitting and distributing direct current (DC) power at a medium voltage level, the method comprising:

converting an on-shore alternating current (AC) source voltage to a medium voltage direct current (MVDC);

transmitting the MVDC to a load module via a sub-sea DC cable link;

converting the MVDC to a medium voltage alternating current (MVAC) via the load module; and distributing the MVAC to a motor system via a sub-sea AC cable link.

Still another exemplary embodiment of the present invention comprises a system for the transmission of a direct current (DC) at a medium voltage level, the system comprising:

means for transmitting on-shore medium voltage DC power to an off-shore sub-sea load module, the load module comprising:

means for down-converting a medium voltage DC;

means for converting the down-converted medium voltage DC to a medium voltage AC; and means for distributing medium voltage AC power from the load module to a sub-sea motor system.

Additional features and advantages are realized through the techniques of the present invention. Yet further embodiments and aspects of the invention are described in detail herein and are considered a part of the claimed invention.

DRAWINGS

The foregoing and other features, aspects and advantages of the invention are apparent from the following detailed description taken in conjunction with the accompanying drawings in which like characters represent like parts throughout the drawings, wherein.

Figure 6:
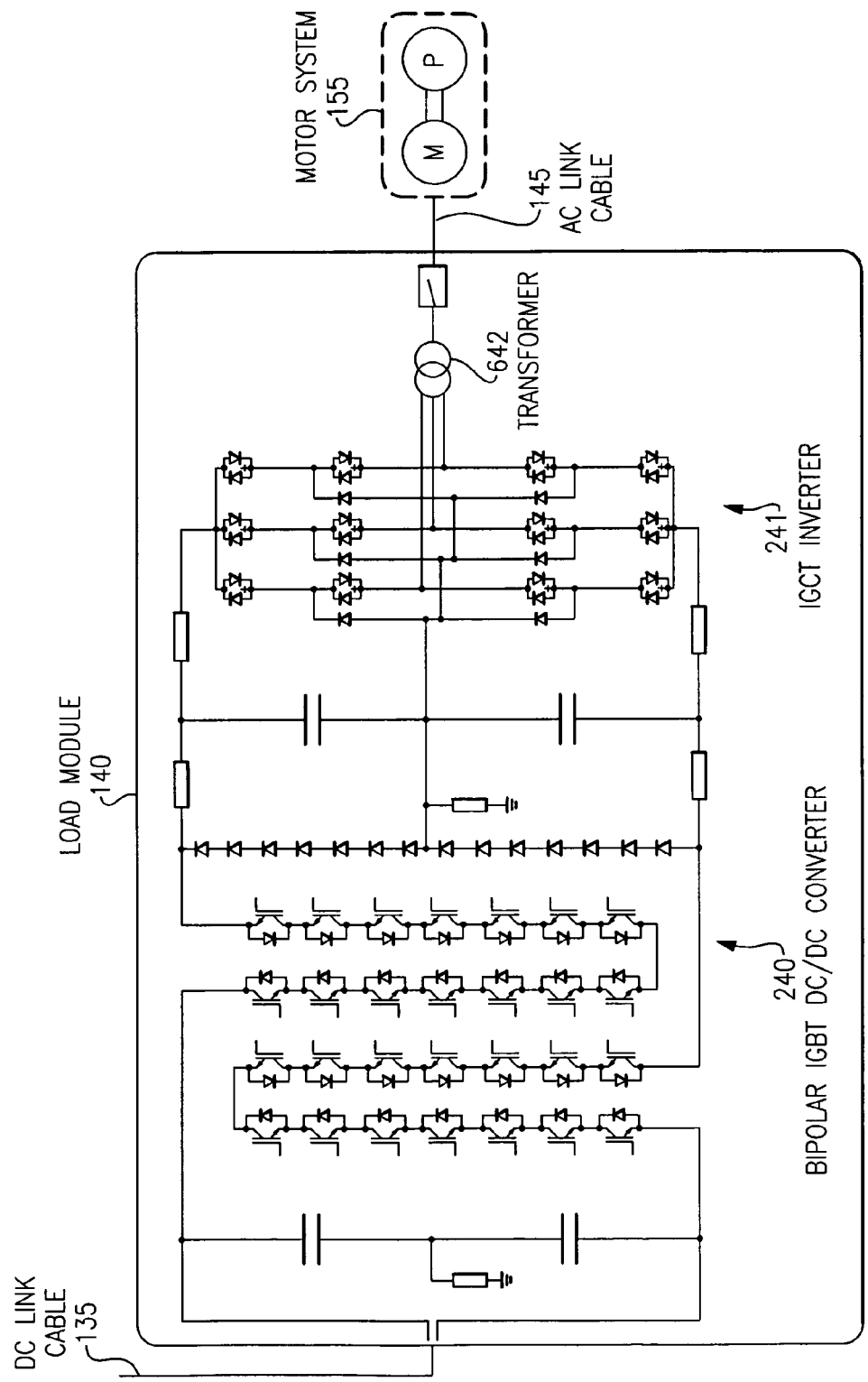
Figure 7:
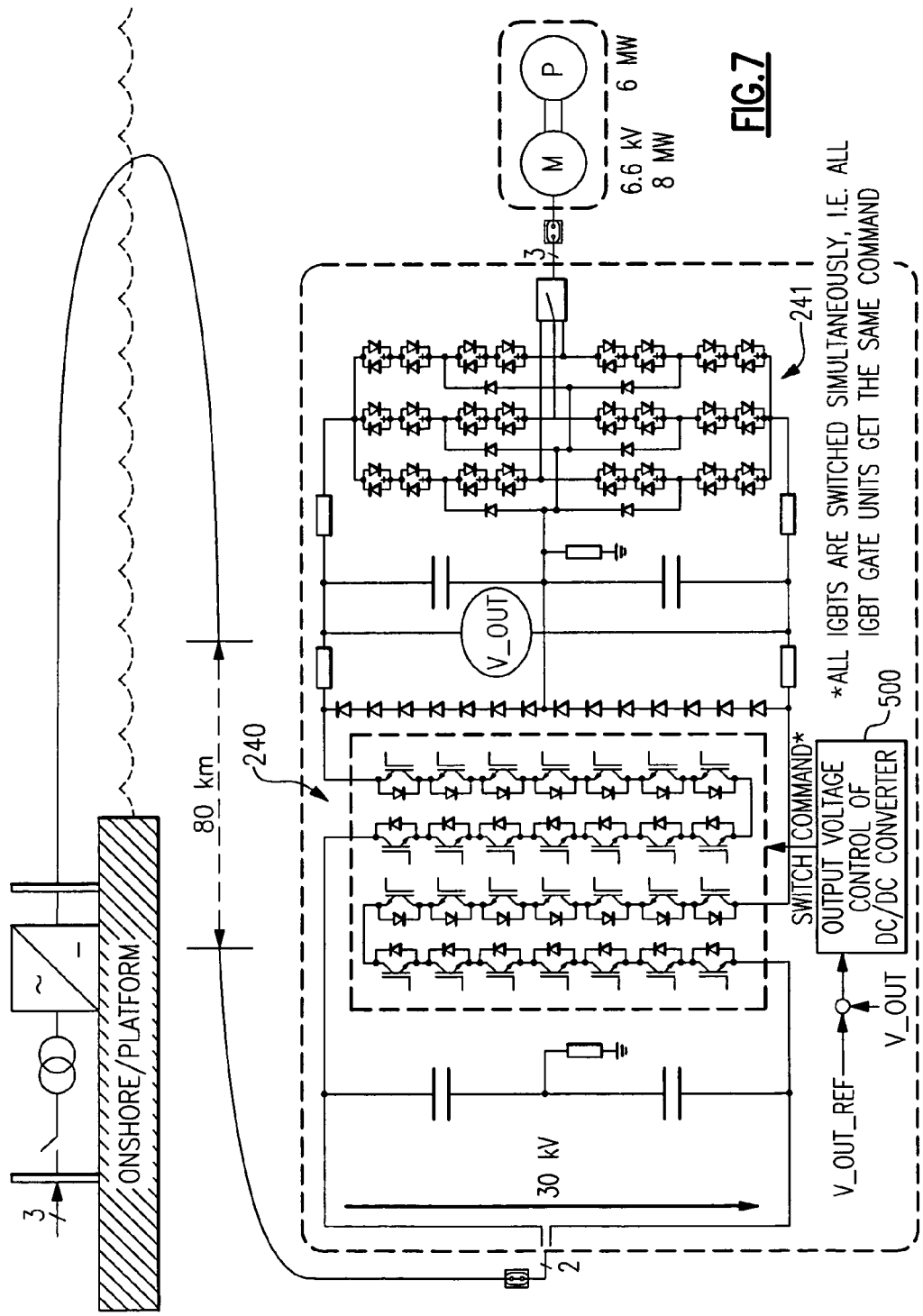

FIG. 6 is a diagram of a bipolar DC/DC converter and enabled load module comprising a transformer in accordance with exemplary embodiments of the present invention; and FIG. 7 is a diagram showing a bipolar DC/DC converter enabled load module including a controller, the controller being configured to drive a voltage delivered from a DC-to-DC voltage step-down converter to a command value in accordance with exemplary embodiments of the present invention.

One or more exemplary embodiments of the invention are described below in detail. The disclosed embodiments are intended to be illustrative only since numerous modifications and variations therein will be apparent to those of ordinary skill in the art.

DETAILED DESCRIPTION

MVDC distribution systems avoid the installation of a high number of components within sub-sea environments (components such as multiple sub-sea transformers, AC switchgear and AC-to-DC converters). Because of the limited voltage level in MVDC distribution systems (e. g., voltages levels such as 20 or 30 kV) the economic transmission capability of MVDC distribution systems is limited to distances below 30 or 40 km. Transmitting bulk power over long distance requires high voltage. Conventional high voltage AC and DC transmission systems use transformers to step- up and step-down the voltage of a transmission system. Combining such HVAC or HVDC transmission with MVDC distribution is not practical for sub-sea installations because of the high number of components involved.

Exemplary embodiments of the present invention provide a solution for the delivery of electrical power from a power source to a distant load by the use of DC transmission methodologies. As such, the exemplary embodiments of the present invention provide novel methodologies for combining MVDC transmission with one or more sub-sea converter systems for the driving of sub-sea motors. Within the exemplary embodiments, the DC voltage level falls within a medium voltage level range. The solution provided by the exemplary embodiments is most effective at delivering power over distances that are greater than 30 kilometers. Further, the solution is effective for the delivery of power from an on-shore to offshore sub-sea load. As such, the solution provided by the exemplary embodiments of the present invention markedly reduce the costs, complexity (i.e., the actual number of implemented components for implementation is reduced), weight, and required implementation space usage that would typically be required for the utilization of conventional power conversion equipment.

Figure 1:
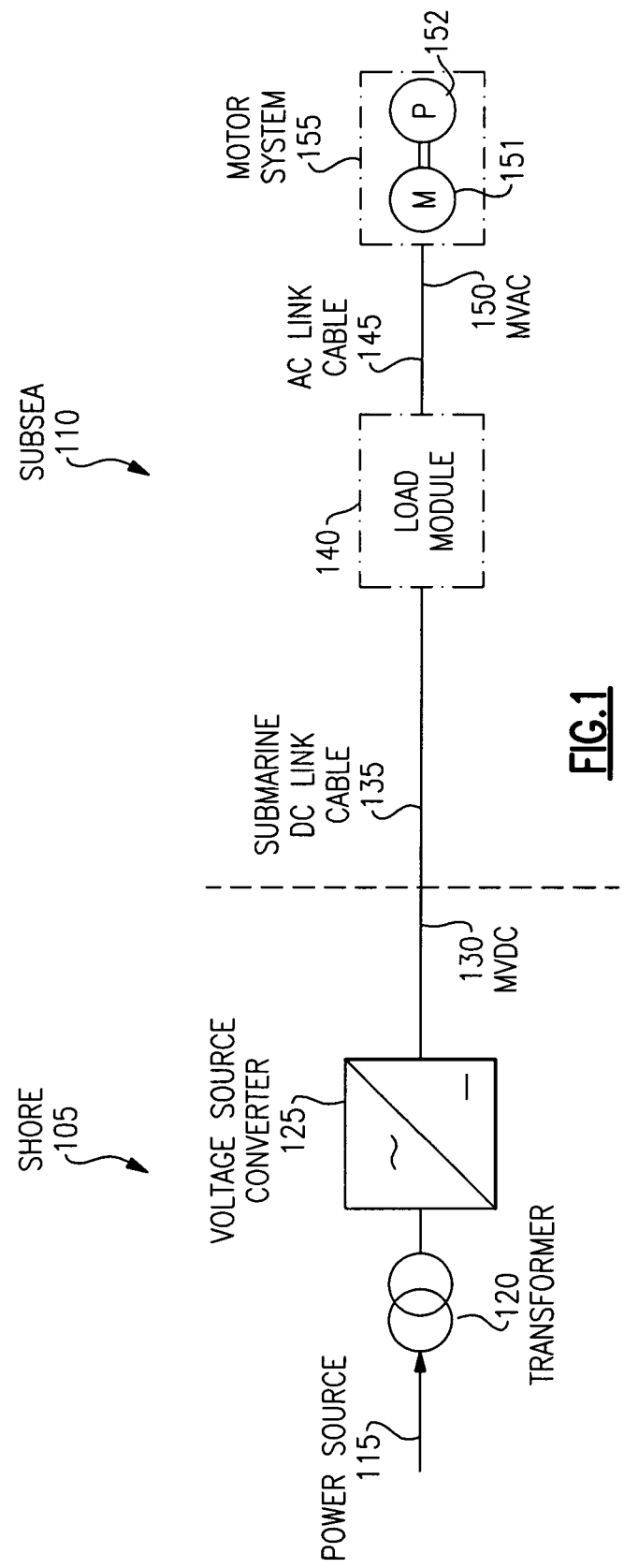
FIG. 1 is a diagram showing a system for MVDC power transmission in accordance with exemplary embodiments of the present invention.

An exemplary MVDC power transmission system and drive system is shown in FIG. 1. The system of FIG. 1 comprises a plurality of elements that are dually positioned on-shore 105 and offshore at a sub-sea location 110. A power source 115 situated on-shore 105 delivers an AC power supply to a transformer 120, thereafter the transformer 120 delivers the power supply to a rectifier 125 (e. g. a diode rectifier, thyristor rectifier or a rectifier that is based on self-commutated devices such as, without limitation, IGBTs, integrated gate commutated thyristors (IGCTs) or gate turn-off thyristors (GTOs), wherein the power supply is converted to a MVDC power supply 130. The MVDC power supply 130 is delivered to a load module 140 via a DC cable link 135, wherein the DC cable link 135 is positioned in a sub-sea 110 location. The MVDC power supply 130 is converted to a MVAC power supply 150 at the load module 140 and is thereafter delivered to a motor system 155 via an AC cable link 145. Within the exemplary embodiments the motor system 155 comprises a motor 151 that is coupled to a pump 152. Within the exemplary embodiments the pump 152 may comprise, but is not limited to a multiphase pump that is based on twin-screw or helico-axial technology, or is a liquids pump (e. g. a centrifugal pump). In further exemplary embodiments the motor 151 can be coupled to a sub-sea gas compressor (i.e., for pressure boosting operations that require the utilization of rotating centrifugal equipment).

Figure 2:
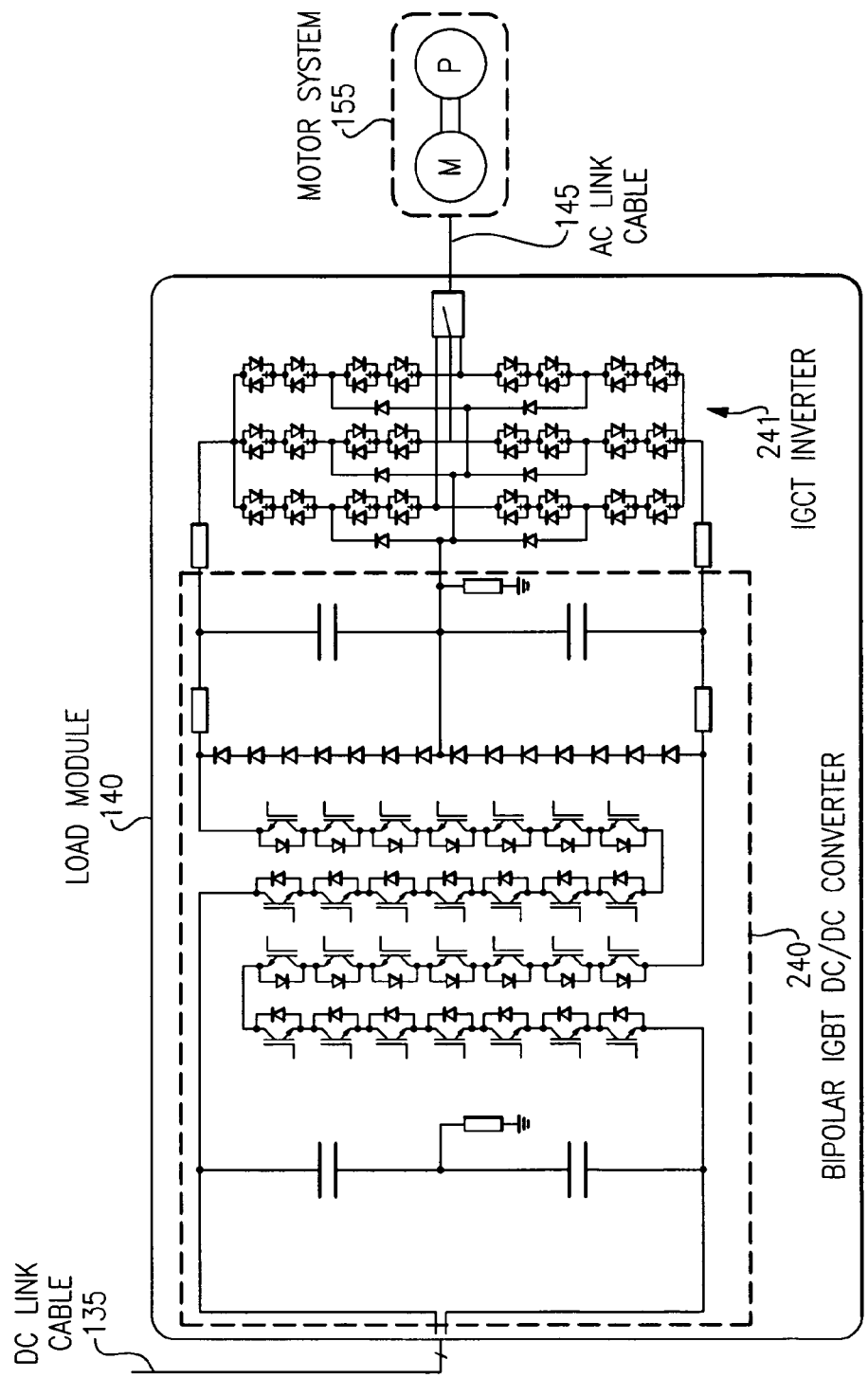
FIG. 2 is a diagram showing a bipolar DC/DC converter enabled load module in accordance with exemplary embodiments of the present invention.

FIG. 2 shows a load module 140 that can be implemented within the exemplary embodiments of the present invention.

As shown, the DC cable link 135 delivers the MVDC power supply 130 to the load module 140. As configured, the DC power supply 130 is initially delivered to the DC-to-DC step-down converter 240, where in this instance the DC-to-DC step-down converter 240 is a bipolar step-down converter that comprises a plurality of bipolar IGBT or IGCT components that are serially connected in relation to each other. As shown, the DC-to-DC step-down converter 240 is configured to take an initial voltage value of +/−15 kV and convert the voltage into two +/−5 kV values. Within further exemplary embodiments the DC-to-DC step-down converter 240 can comprise a unipolar step-down converter; in this instance voltage values on the magnitude of 0 to 30 kV can be converted to 0 to 10 kV values.

As shown in FIG. 2, the converted MVDC 130 output from the DC-to-DC step down converter 240 provides the input to a DC-to-AC inverter 241, wherein the DC-to-AC inverter comprises a plurality of IGCT or IGBT components. The DC-to-AC inverter 241 is charged with converting the output voltage of the DC-DC converter 240 to a MVAC 150. The output MVAC 150 is thereafter delivered to a motor system 155 via an AC cable link 145 that is coupled between the output of the load module 140 and the input of the motor system 155.

Figure 3:
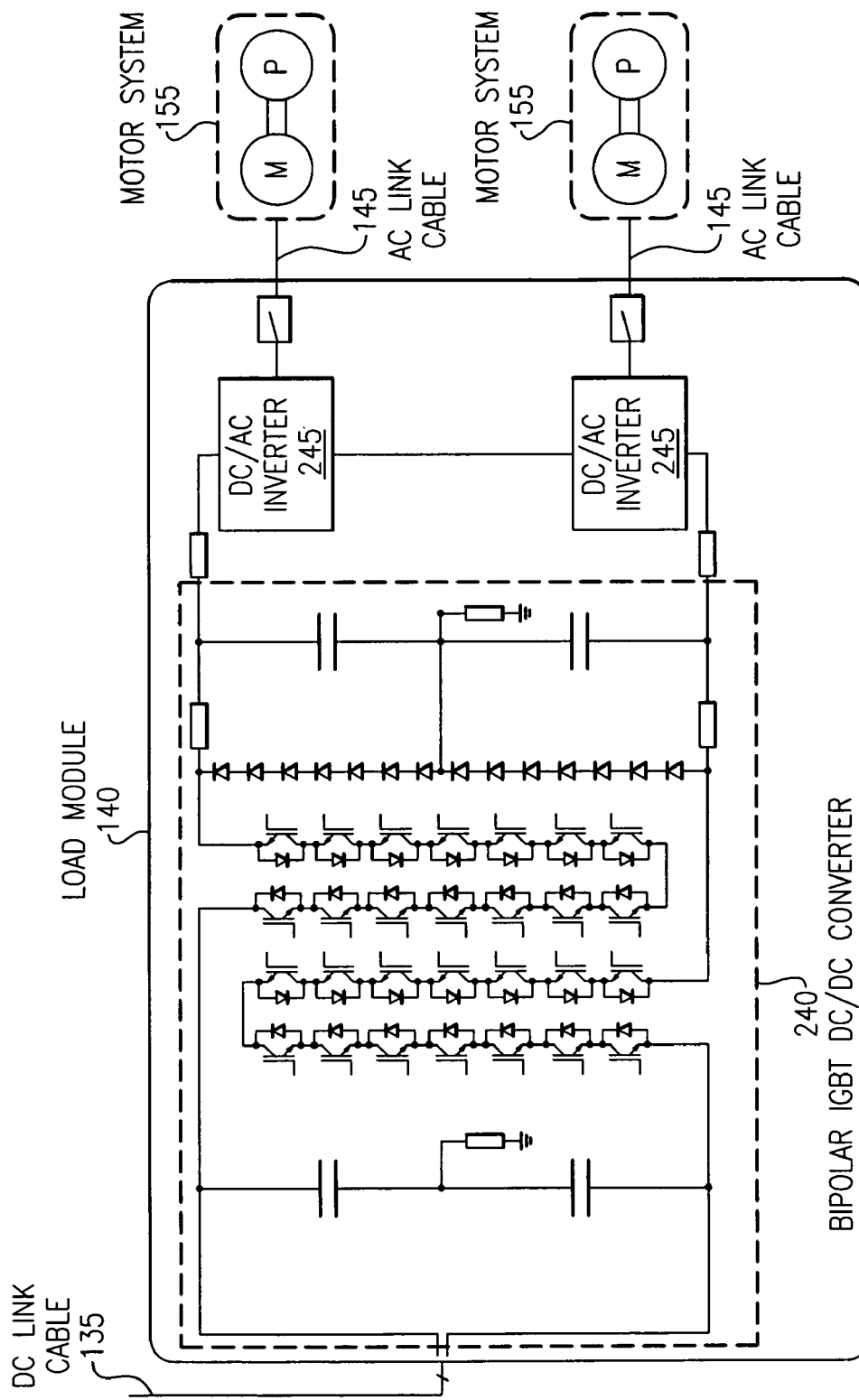
FIG. 3 is a diagram showing a system for MVDC power transmission and distribution in accordance with exemplary embodiments of the present invention.

FIG. 3 shows a yet further exemplary embodiment of the present invention provided for a system for the transmission and distribution of a MVDC 130. In this configuration a system DC cable link 135 is configured to carry power from a power source 115 to a load module 140. In this instance the load module 140 comprises a DC-to-DC voltage step-down converter 240 and a DC distribution system on the load side of the DC-to-DC voltage step-down converter 240. The DC distribution system comprises at least two variable input voltage DC-to-AC power inverter modules 245, wherein the DC-to-AC inverters 245 are coupled in series to the system DC cable link downstream from the DC-to-DC voltage step-down converter 240. As such, the DC-to-DC converter 240 is operably coupled between the system DC cable link 135 and the DC-to-AC inverters 245. Further, respective AC cable links 145 are implemented in conjunction with each DC-to-AC inverter 245 in order to carry power from each DC-to-AC inverter 245 to a motor system 155 that is coupled to an AC cable link 145 on the load side of the DC-to-AC inverter 245. All sub-sea converters are shown installed in one module for illustrative purposes. Within exemplary embodiments in order to facilitate the sub-marine configuration and maintenance of the sub-sea equipment, an installation of each single sub-sea converter 240 in relation to an upper motor system 155 and lower motor system (155 as shown in FIG. 3 may be considered favorable.

Within further exemplary embodiments a controller 500 depicted in FIG. 7 can be implemented in conjunction with the MVDC transmission and drive or distribution systems. As such, the controller 500 is operably coupled with the DC-to-DC step-down converter 240. Within the exemplary configuration of supplying only one sub-sea motor, the controller 500 would be implemented to ensure that the DC-to-DC step-down converter delivers a constant output voltage value to the DC-to-AC inverter 241. When at least two DC-to-AC inverters 245 such as depicted in FIG. 3 are coupled in series to the output of the DC-to-DC voltage step-down converter 240, the controller 500 may be configured to deliver a constant output current value to the series connected DC-to-AC inverters 245. The controller 500 may be operated in island mode or connected to a high-level control system. The implementation of the controller 500 might use a redundant configuration of the control boards.

Figure 4:
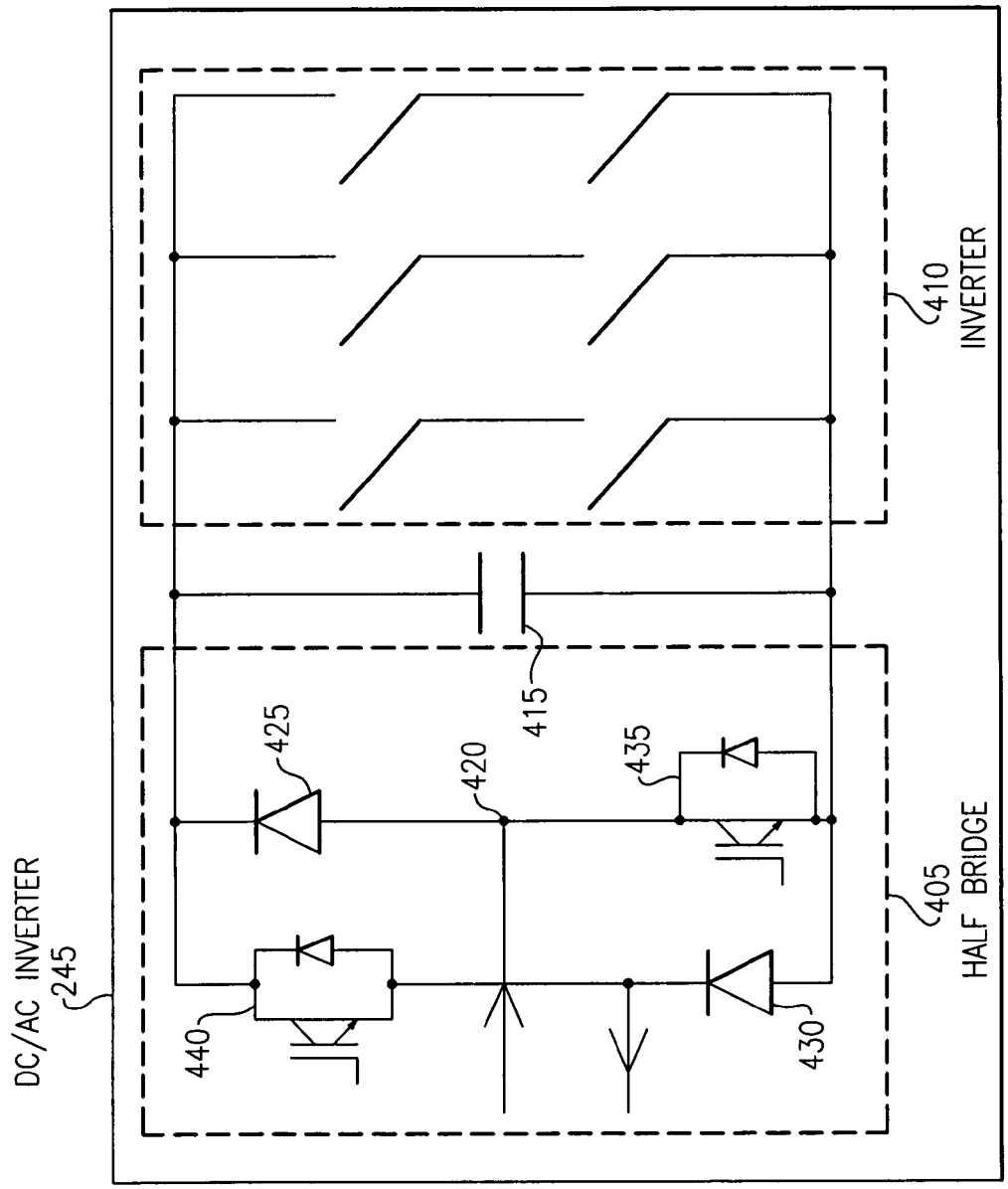
FIG. 4 is a diagram of a DC/AC inverter in accordance with exemplary embodiments of the present invention.

FIG. 4 shows a detailed diagram of a DC-to-AC inverter 245 that may be implemented within the exemplary embodiments of the present invention. The DC-to-AC inverter 245 comprises an inverter 410, wherein a half bridge 405 is coupled between the output of the DC-DC step-down converter 240 and the inverter 410. A module DC link 415 couples the half bridge 405 and inverter 410. In a further exemplary embodiment, the half bridge 405 comprises an asymmetrical half bridge. The half bridge 405 is used for controlling current to a load, whereas the inverter 410 is used for controlling voltage to a load. The power to the load may be adjusted by controlling the current, the voltage, or a combination of the current and voltage. As shown in FIG. 4, the half bridge 405 comprises two diodes 425, 430 and two switches 435, 440. Terminal 420 is configured for receiving input power and supplying the input power to the inverter 410 through the diodes 425, 430 when the switches 435 and 440 are open. The switches 435 and 440 may comprise any appropriate switching devices with several examples including IGBTs, IGCTs, and GTOs.

Figure 5:
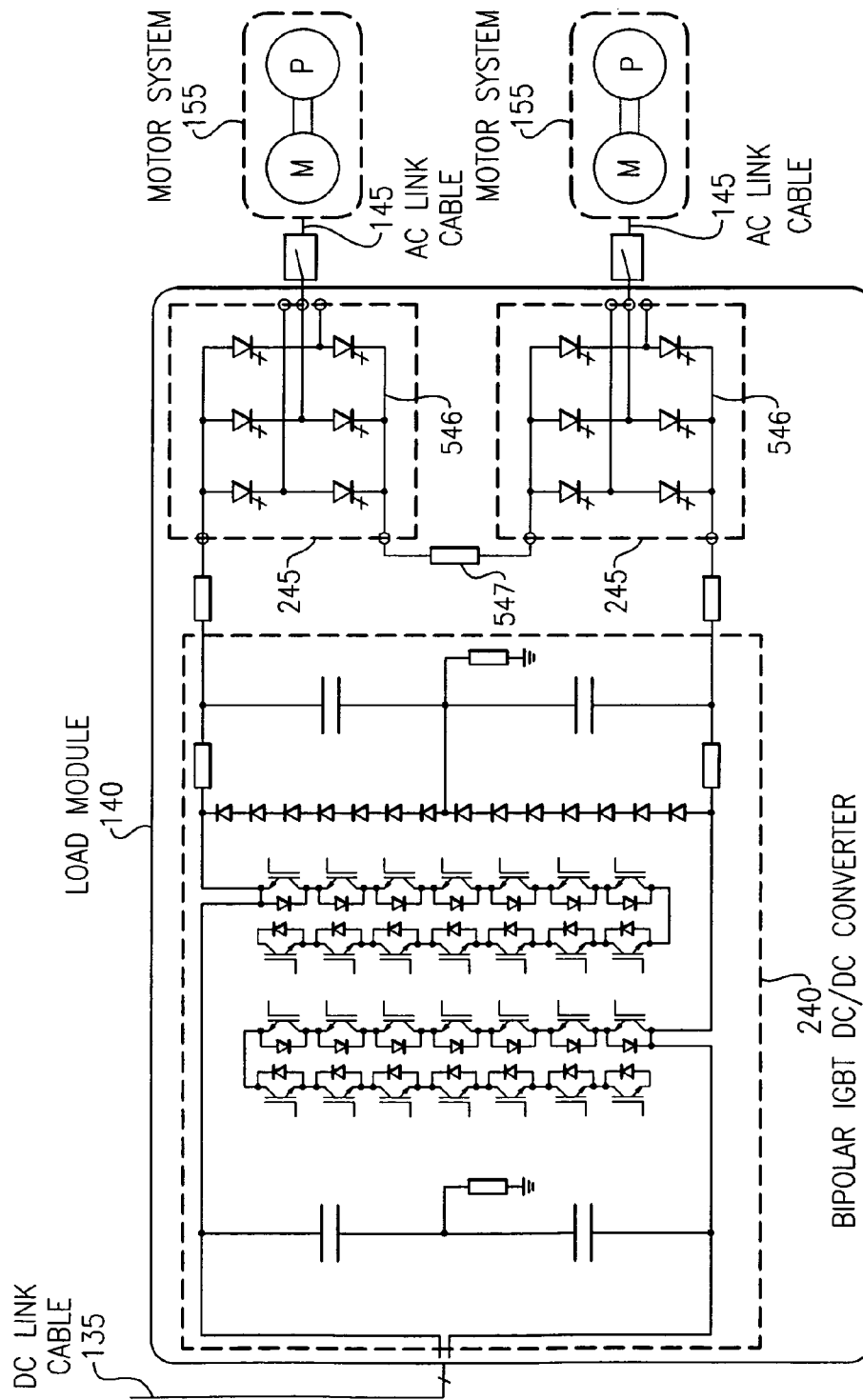
FIG. 5 is a diagram showing a system for MVDC power transmission and distribution in accordance with exemplary embodiments of the present invention.

FIG. 5 shows another diagram of two series-connected DC-to-AC inverters 245 that may be implemented within exemplary embodiments of the present invention. Within this configuration, the variable input voltage DC-to-AC power inverter module 245 comprises a six-pulse (alternatively a twelve-pulse) GTO bridge 546. Control of the bridges 546 is performed by measuring the voltages at the inverter 245 output and controlling the inverter 245 input voltages by applying corresponding switching patterns to the GTOs (standard six-step GTO control pattern). A DC link inductor 547 as shown in FIG. 5 provides de-coupling of the two CSIs. De-coupling elements between the series connected inverters may also be implemented in other embodiments (e. g. in FIG. 3), but are of less importance than with CSIs because the applicable switching frequency for the GTOs in FIG. 5 is significantly lower than the switching frequency of the VSIs as presented in FIG. 4. The series connected CSI bridges are not limited to using GTOs but could also be realized with other self-commutated devices, such as Switching Gate Commutated Thyristors (SGCTs), or with line commutated devices such as thyristors. In the case that thyristors are implemented, the same control scheme as with Load Commutated Inverter (LCI) driven motors would be used.

An advantage of the structural configuration of the exemplary embodiments of the present invention is that the usage of transformers is not necessitated. However, in the event that it is desired to reduce the voltage of the DC-to-DC converter 240 yet more, or to electrically insulate the downstream motor system 155, a transformer can be implemented within further exemplary embodiments. As shown in FIG. 6 the DC cable link 135 delivers the MVDC power supply 130 to the load module 140. The DC power supply 130 is initially delivered to the DC-to-DC step-down converter 240. The converted MVDC 130 output from the DC-to-DC step down converter 240 is input to a DC-to-AC inverter 241, the output from the DC-to-AC inverter being input to the transformer 642. The output MVAC is thereafter delivered to a motor system 155 via the AC cable link 145 that is coupled between the output of the load module 140 and the input of the motor system 155.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for the transmission of a direct current (DC) at a medium voltage level, the system comprising:
   a system DC link, wherein the system DC link is configured to carry power from a source to a load module, the load module comprising:
      a DC-to-DC voltage step-down converter,
      a DC-to-AC inverter, the DC-to-AC inverter coupled downstream to the DC-to-DC voltage step-down converter; and
   a system AC link for carrying power from the load module to a motor system on a load side of the system AC link.

2. The system of claim 1, wherein the DC-to-DC voltage step-down converter comprises a bipolar voltage step-down converter.

3. The system of claim 1, wherein the DC-to-DC voltage step-down converter comprises a unipolar voltage step-down converter.

4. The system of claim 3, wherein the DC-to-AC converter is coupled to a transformer on a source side of the system AC link.

5. The system of claim 1, further comprising a controller, the controller being configured to drive a voltage delivered from the DC-to-DC voltage step-down converter to a command value.

6. A system for the transmission and distribution of a direct current (DC) at a medium voltage level, the system comprising:
   a system DC link, wherein the system DC link is configured to carry power from a source to a load module, the load module comprising:
      a DC-to-DC voltage step-down converter, and
      a DC distribution system on the load side of the DC-to-DC voltage step-down converter, the DC distribution system comprising:
         at least two DC-to-AC power inverter modules coupled to the output of the step-down converter; and
         at least two system AC links for carrying power from each DC-to-AC power inverter module to a motor system on a load side of the system AC link.

7. The system of claim 6, wherein each DC-to-AC power inverter module comprises a voltage source inverter VSI and a DC-to-DC converter, the DC-to-DC converter being coupled between the DC link downstream the DC-to-DC voltage step-down converter and the VSI.

8. The system of claim 6, wherein each DC-to-AC power inverter module comprises a current source inverter.

9. The system of claim 6, wherein the DC-to-AC power inverter module is coupled to a transformer on a source side of the system AC link.

10. The system of claim 6, further comprising controllers, the controller of the DC-to-DC voltage step-down converter being configured to drive a current delivered from the DC-to-DC voltage step-down converter to a command value.

11. A method of transmitting and distributing direct current (DC) power at a medium voltage level, the method comprising:
   converting an on-shore alternating current (AC) source voltage to a medium voltage direct current (MVDC);
   transmitting the MVDC to a load module via a sub-sea DC cable link;
   converting the MVDC to a medium voltage alternating current (MVAC) via the load module; and
   distributing the MVAC to a motor system via a sub-sea AC cable link.

12. The method according to claim 11, further comprising driving a sub-sea pump via the MVAC motor system.

13. The method according to claim 11, wherein converting the MVDC to a medium voltage alternating current (MVAC) via the load module comprises:
   down converting the MVDC to a lower MVDC; and
   converting the lower MVDC to the MVAC.

14. The method according to claim 11, wherein converting the MVDC to a medium voltage alternating current (MVAC) via the load module comprises controlling a DC-to-DC step-down converter such that the step-down converter delivers a desired constant output voltage to at least one DC-to-AC inverter.

15. A system for the transmission of a direct current (DC) at a medium voltage level, the system comprising:
   means for transmitting on-shore medium voltage DC power to an off-shore sub-sea load module, the load module comprising:
      means for down-converting a medium voltage DC;
      means for converting the down-converted medium voltage DC to a medium voltage AC; and
      means for distributing medium voltage AC power from the load module to a sub-sea motor system.

16. The system according to claim 15, wherein the means for down-converting a medium voltage DC comprises a unipolar or bipolar voltage step-down converter.

17. The system according to claim 15, further comprising means for converting the medium voltage AC power to a desired voltage AC power.

18. The system according to claim 15, further comprising means for controlling a voltage delivered from the down converting means to a command value.

19. The system according to claim 15, wherein the means for converting the down-converted medium voltage DC to a medium voltage AC comprises a half bridge configured for controlling current delivered to the sub-sea motor system.

20. The system according to claim 15, wherein the means for converting the down-converted medium voltage DC to a medium voltage AC comprises an inverter configured for controlling voltage delivered to the sub-sea motor system.

* * * * *